THOMAS J. MAYALL.
Improvement in Vulcanized Rubber Tubing.
No. 125,596. Patented April 9, 1872.
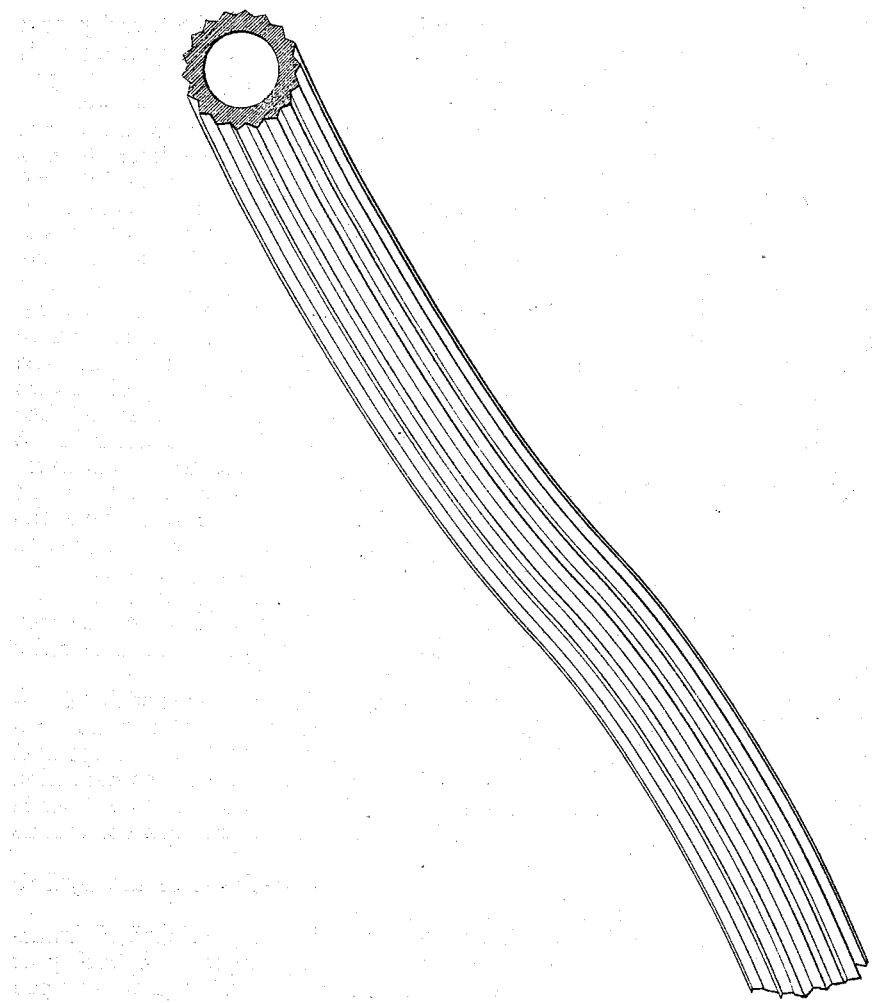

125,596

UNITED STATES PATENT OFFICE.

THOMAS J. MAYALL, OF BOSTON, MASSACHUSETTS.

IMPROVEMENT IN VULCANIZED-RUBBER TUBINGS.

Specification forming part of Letters Patent No. 125,596, dated April 9, 1872.

*To whom it may concern:*

Be it known that I, THOMAS J. MAYALL, of Boston, Suffolk county, Massachusetts, have invented certain new and useful Improvements in Vulcanized India-Rubber Hose or Tubing, of which the following is a specification:

My invention is directed to the production of vulcanized India-rubber hose or tubing formed with an ornamental pattern or configuration in relief upon its exterior.

Tubing of this kind has never, so far as my knowledge extends, been hitherto made, owing, undoubtedly, to the difficulty or rather impossibility of preserving the external pattern or ornamental configuration during the several processes at present employed in order to vulcanize and finish hose or tubing.

It has been my object to render practicable the manufacture of this kind of hose or tubing; and, to this end, I proceed as follows: I form the pattern or ornamental configuration in relief on the rubber when it is passing in sheet form from the calender-rolls, such as usually employed in rubber manufacture, using for this purpose a pattern-roll pressing up against one of the calenders, between which pattern-roll and the calender the rubber sheet passes, and is consequently impressed with the configuration or ornamental design formed in intaglio, or engraved in the pattern-roll. The sheet after being thus impressed, is, in the usual way, cut up into strips suitable for tubing, and is then formed into hose or tubing in any suitable manner. In the manufacture of tubing with a fluted exterior—for instance, such as shown in the accompanying drawing—I draw the previously-impressed strip through a funnel or hollow tapering former, such as described in Letters Patent issued to me of even date herewith, the smaller end of the funnel being formed with scallops or projections corresponding in pattern to the irregular sectional outline of the tubing.

In lieu of now wrapping the hose or tubing in cloth, sheet metal, or foil, as is the usual practice, but which would be fatal to the production of this tubing, as the ornamental pattern upon its exterior would be thereby, to a great extent, if not wholly, obliterated; and, also, in lieu of tightly packing the tubing in soap-stone in a tight and covered box—which is a process adapted only to the vulcanizing of small articles—I run the tubing from the machine upon a long plate or shallow trough, provided with a bed of powdered soap-stone, pumice, or other suitable material, which will adapt itself to the external configuration of the hose, so that the latter may rest upon the bed evenly at all points; and then, when the required amount of tubing has accumulated on the bed, I throw over it lightly, and just so as to cover it, an additional quantity of pumice or soap-stone, the object being to keep the hose from immediate contact with the steam in the heater. The trough or plate, which is, as usual in such cases, carried by a truck or mounted on wheels, is run into the heater, where the tubing is subjected to heat until vulcanized and cured, the pattern being perfectly preserved during the operation, In this way I produce hose or tubing having any desired ornamental pattern or configuration in relief upon its exterior.

I have described the manner in which I prefer to proceed in order to form the ornamentation upon the rubber. But it is manifest that this may be varied, and that the ornamentation may be produced not only when the rubber is in sheet form, but even after it has been made into a tube.

What I claim, and desire to secure by Letters Patent, is—

As a new manufacture, vulcanized India-rubber hose or tubing, made with fluting or other ornamental configuration in relief upon its exterior, substantially in the manner herein described.

In testimony whereof I have signed my name to this specification before two subscribing witnesses.

THOS. J. MAYALL.

Witnesses:
EDM. F. BROWN,
M. BAILEY.